(12) United States Patent
Nakazawa et al.

(10) Patent No.: US 7,821,682 B2
(45) Date of Patent: Oct. 26, 2010

(54) BUFFER CIRCUIT, IMAGE READING APPARATUS, AND IMAGE FORMING APPARATUS

(75) Inventors: Masamoto Nakazawa, Kanagawa (JP); Tohru Kanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 904 days.

(21) Appl. No.: 11/702,626

(22) Filed: Feb. 6, 2007

(65) Prior Publication Data

US 2007/0188638 A1    Aug. 16, 2007

(30) Foreign Application Priority Data

Feb. 7, 2006    (JP) ............... 2006-030087

(51) Int. Cl.
*H04N 1/40* (2006.01)
*H04N 5/225* (2006.01)
(52) U.S. Cl. ............... 358/474; 358/446; 348/207.99
(58) Field of Classification Search ......... 713/401;
348/231.2, 232, 333.06, 333.01, 231, 222, 348/376, 207, 231.3, 231.99, 222.1, 207.99, 348/241, 372, 311, 294, 314, 348; 250/200, 250/201.1, 552, 559.05, 559.06; 358/404, 358/442, 444, 213.016, 204, 420, 423, 1.16
See application file for complete search history.

(56) References Cited

U.S. PATENT DOCUMENTS 5,278,656 A * 1/1994 Hynecek et al. ........ 348/207.99
5,986,702 A * 11/1999 Maki .................... 348/241
6,198,349 B1  3/2001 Kanno
6,426,804 B1  7/2002 Kanno
6,563,535 B1 * 5/2003 Anderson ............... 348/231.2
2004/0047007 A1  3/2004 Kanno
2005/0001908 A1 * 1/2005 Lee ...................... 348/231.2
2006/0001752 A1 * 1/2006 Yanagisawa et al. ....... 348/308
2006/0184815 A1 * 8/2006 Ha et al. .................. 713/500
2006/0250356 A1 * 11/2006 Sawamura ................ 345/156
2008/0265782 A1 * 10/2008 Crouse et al. ............. 315/158
2008/0292243 A1 * 11/2008 Izumo et al. ............... 385/31

FOREIGN PATENT DOCUMENTS

| JP | 10-122698 | 5/1998 |
| JP | 2000-101936 | 4/2000 |
| JP | 2006-314039 | 11/2006 |

OTHER PUBLICATIONS

Office Action for Japanese patent application No. 2006-030087 dated May 27, 2010.

* cited by examiner

*Primary Examiner*—Jerome Grant, II
(74) *Attorney, Agent, or Firm*—Harness, Dickey & Pierce, P.L.C.

(57) ABSTRACT

Example embodiments of the present invention relate generally to a buffer circuit capable of suppressing the adverse influence of excessive voltage or current output from a photoelectric converting element on an analog signal processing circuit coupled to the photoelectric converting element, and an image reading apparatus or image forming apparatus incorporating the photoelectric converting element, the buffer circuit, and the analog signal processing circuit.

18 Claims, 16 Drawing Sheets

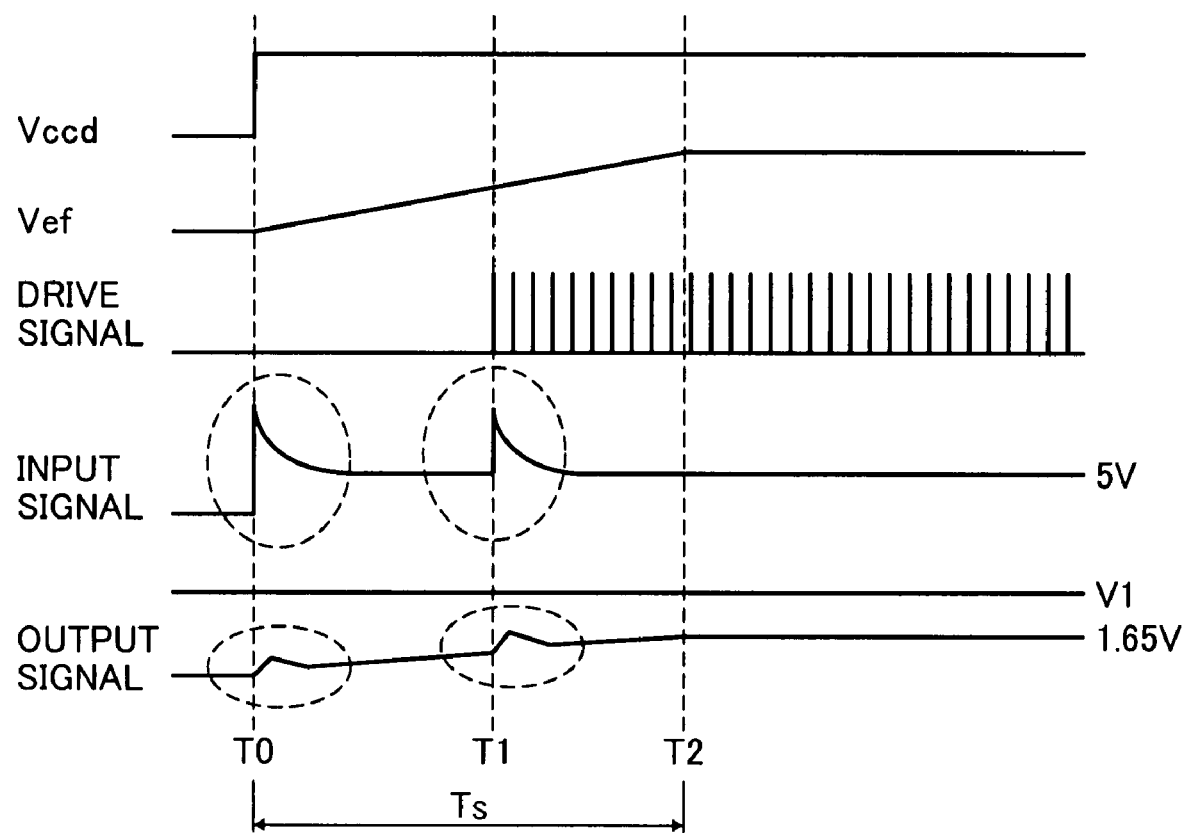

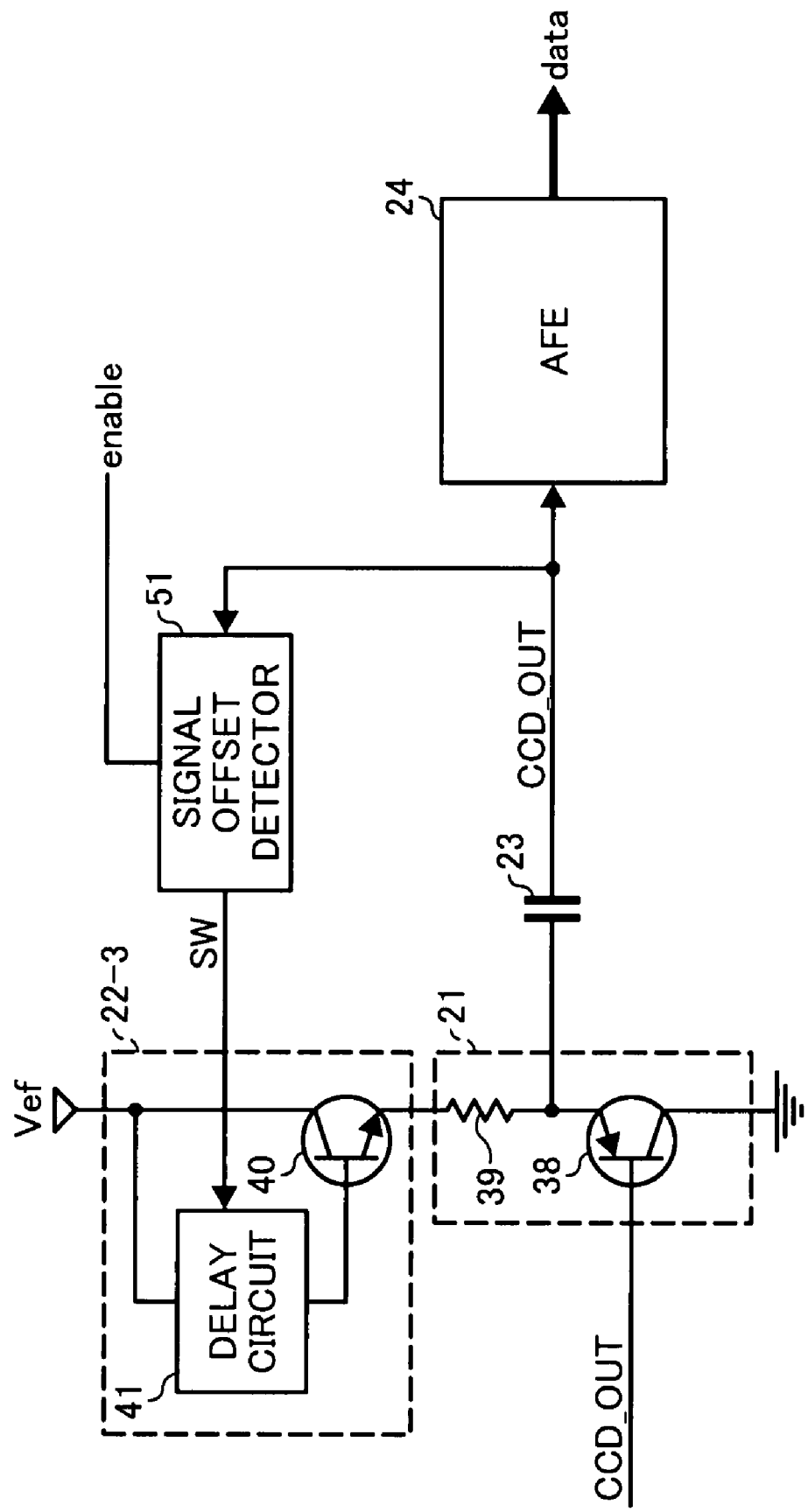

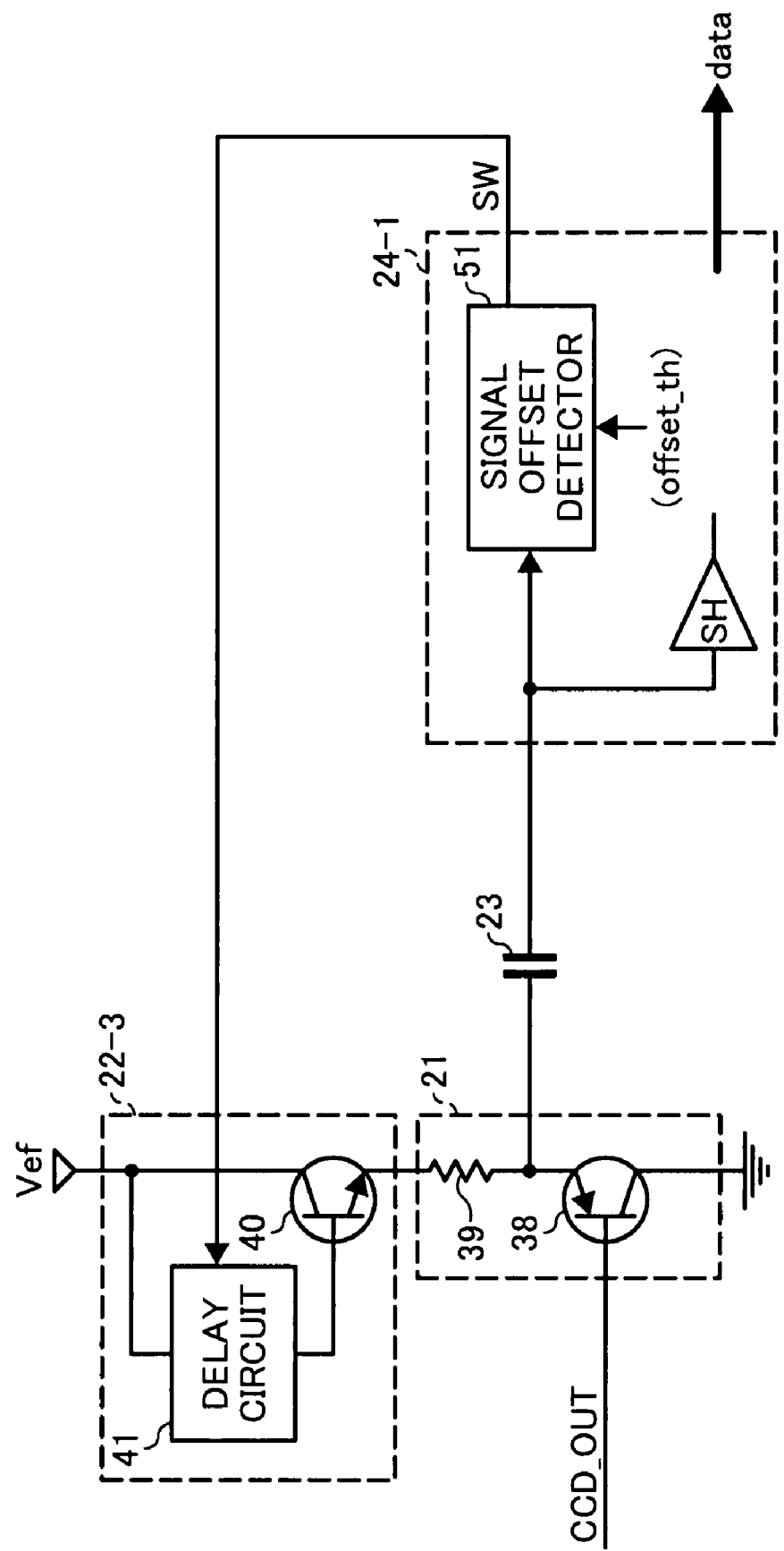

US 7,821,682 B2

BUFFER CIRCUIT, IMAGE READING APPARATUS, AND IMAGE FORMING APPARATUS

CROSS-REFERENCE TO RELATED APPLICATIONS

This patent application is based on and claims priority under 35 U.S.C. §119 to Japanese patent application No. 2006-030087, filed on Feb. 7, 2006, in the Japanese Patent Office, the entire contents of which are hereby incorporated by reference.

FIELD OF THE INVENTION

Example embodiments of the present invention relate generally to a buffer circuit capable of suppressing the adverse influence of excessive voltage or current output from a photoelectric converting element on an analog signal processing circuit coupled to the photoelectric converting element, and an image reading apparatus or image forming apparatus incorporating the photoelectric converting element, the buffer circuit, and the analog signal processing circuit.

DESCRIPTION OF THE RELATED ART

In order to read an original image into image data, a light beam reflected from the original is converted to an analog electric signal using a photoelectric converting element, such as charged coupled device (CCD). An analog signal processing circuit, which is coupled to the photoelectric converting element, applies various signal processing to the analog electric signal including converting from the analog electric signal to a digital electric signal, and outputs the digital electric signal for further processing. The analog signal processing circuit, which performs various analog signal processing, may be known as an Analog Front End (AFE) device. As illustrated in FIG. 1, the CCD 19 and the AFE device 124 may be connected with each other via an analog signal buffer 121 and a capacitor 123.

Since the AFE device 124 is connected to the CCD 19 through the alternating current (AC) coupling, the AFE device may be influenced by the AC component of the CCD_OUT signal output from the CCD 19. For example, when the power is turned on or off, the CCD_OUT signal having the excessive voltage level may be output from the CCD 19 due to the change in direct current potential, which may cause the signal input to the AFE device to exceed a rated voltage level. If the number of turning on or off increases, the AFE device may be damaged or the performance of the AFE device may be lowered.

SUMMARY

Example embodiments of the present invention include a buffer circuit provided between a photoelectric converting element and an analog signal processing circuit, which includes an analog signal buffer and a delay device. The analog signal buffer, which is supplied with supply voltage from a power supply, inputs an electric analog signal output from the photoelectric converting element and outputs the electric analog signal to the analog signal processing circuit. The delay device, which is provided between the power supply and the analog signal buffer, controls a rate of change in supply voltage input to the analog signal buffer such that rise time or fall time of the supply voltage of the analog signal buffer is made longer than rise time or fall time of supply voltage of the photoelectric converting element. The buffer circuit may be incorporated in an apparatus, such as an image reading apparatus or an image forming apparatus.

Other example embodiments of the present invention include a buffer circuit provided between a photoelectric converting element and an analog signal processing circuit, which includes an analog signal buffer and a current controller. The analog signal buffer, which is supplied with supply voltage from a power supply, inputs an electric analog signal output from the photoelectric converting element and outputs the electric analog signal to the analog signal processing circuit. The current controller controls a current that flows between the analog signal processing circuit and the analog signal buffer such that the current is prevented from exceeding a reference level. The buffer circuit may be incorporated in an apparatus, such as an image reading apparatus or an image forming apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is a timing chart illustrating operation of controlling rise time of an analog signal buffer when a buffer input signal having the excessive voltage level is input to the analog signal buffer as illustrated in FIG. 6, according to an example embodiment of the present invention;

FIG. 10A is a schematic block diagram illustrating a buffer circuit provided between a CCD and an AFE device, according to an example embodiment of the present invention;

FIG. 12A is a schematic block diagram illustrating an AFE device and a buffer circuit, according to an example embodiment of the present invention;

DETAILED DESCRIPTION OF THE INVENTION

Figure 1:
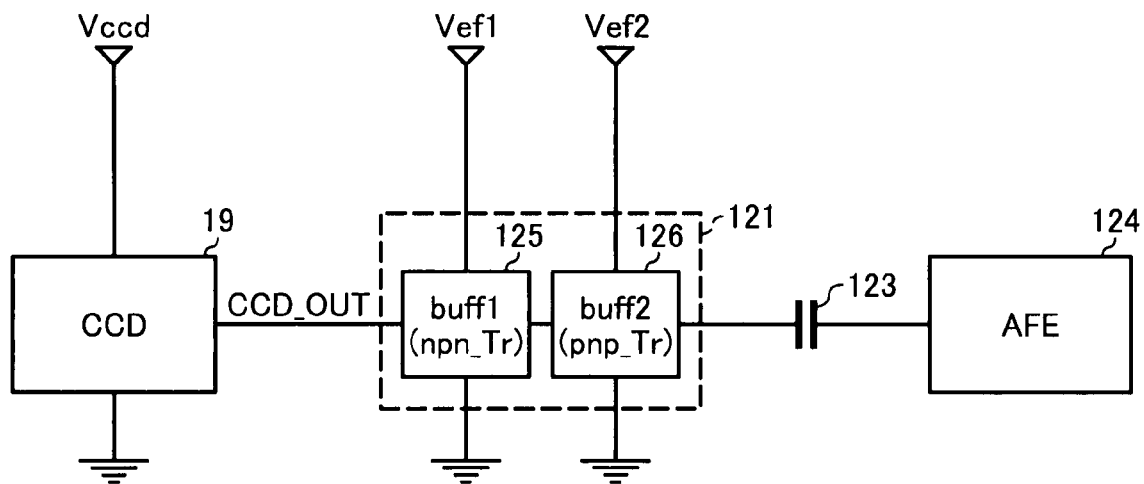
FIG. 1 is a schematic block diagram illustrating a background circuit including a CCD and an AFE device.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Figure 2:
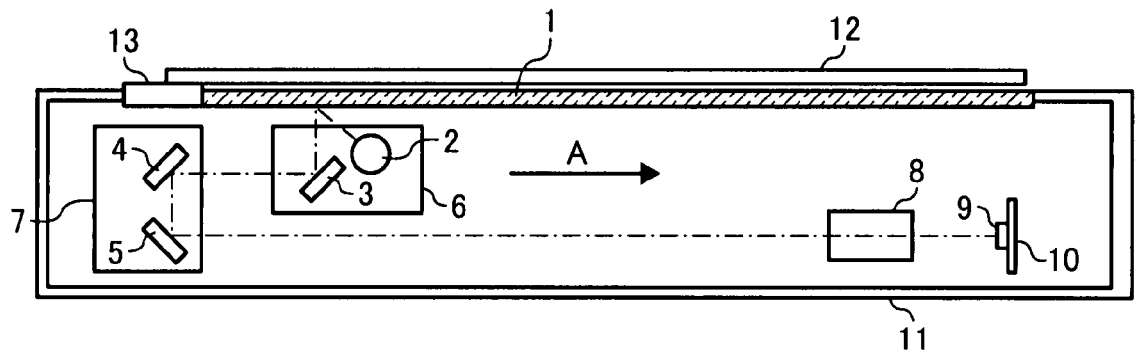
FIG. 2 is a cross-sectional view illustrating the structure of an image reading apparatus, according to an example embodiment of the present invention.

Referring now to the drawings, wherein like reference numerals designate identical or corresponding parts throughout the several views, FIG. 2 illustrates an image reading apparatus 11 according to an example embodiment of the present invention.

The image reading apparatus 11 of FIG. 2 includes an exposure glass 1, a first carriage 6 having a light source 2 and a first reflective mirror 3, a second carriage 7 having a second reflective mirror 4 and a third reflective mirror 5, a lens unit 8, a charged coupled device (CCD) 9, a sensor board unit 10, and a white reference board 13. In addition to the elements shown in FIG. 2, the image reading apparatus 11 may include one or more elements, such as a motor that drives the first carriage 6 or the second carriage 7. The image reading apparatus 11 is capable of reading an original 12 placed on the exposure glass 1 into image data, for example, as described below. The image reading apparatus 11 may be provided alone or it may be incorporated in an image forming apparatus.

In operation, when the original 12 is placed on the exposure glass 1, the first carriage 6 and the second carriage 7 scan the original in a sub scanning direction indicated by the arrow A. At the same time, the light source 2, such as an exposure lamp, irradiates a light beam onto the original 12. The light beam reflected from the original 12 is directed toward the lens unit 8 via the first, second, and third reflective mirrors 3, 4, and 5 such that an image is formed on the CCD 9, which is provided on the sensor board unit 10. The image formed on the CCD 9 is converted to an analog signal. In this example, the function of the CCD 9 may be performed by any desired image sensor, such as a linear CCD. The analog signal output by the CCD 9 is further input to an analog front end (AFE) device 24 (FIG. 3) for further processing. The AFE device 24, which may be implemented by an analog signal processing circuit, applies various analog signal processing including digital/analog conversion to the analog signal output from the CCD 9.

Figure 3:
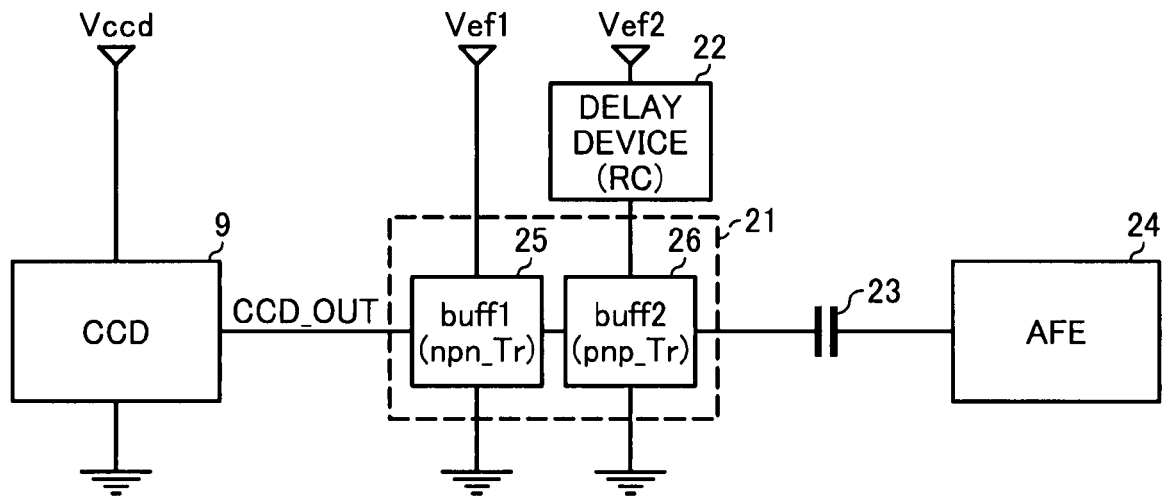
FIG. 3 is a schematic block diagram illustrating a buffer circuit provided between a CCD and an AFE device, according to an example embodiment of the present invention.

As illustrated in FIG. 3, between the CCD 9 and the AFE device 24, an analog signal buffer 21, a delay device 22, and a condenser 23 are provided. For the descriptive purpose, the circuit including the analog signal buffer 21, the delay device 22, and the condenser 23, which is provided between the CCD 9 and the AFE device 24, may be referred to as a buffer circuit. In this example, the buffer circuit is assumed to include one set of the analog signal buffer 21 and the delay device 22. Alternatively, more than one set of the analog signal buffer 21 and the delay device 22 may be provided. For example, when the image reading apparatus 11 of FIG. 1 is implemented by a color image reading apparatus, three sets of the analog signal buffer 21 and the delay device 22 may be provided for the respective colors of red, green, and blue.

The CCD 9, which is supplied with supply voltage Vccd, outputs an analog signal CCD_OUT. The analog signal CCD_OUT output by the CCD 9, which may be referred to as a buffer input signal of the analog signal buffer 21, is input to the analog signal buffer 21 of the buffer circuit. The analog signal buffer 21 outputs the analog signal CCD_OUT, which may be referred to as a buffer output signal of the analog signal buffer 21, to the AFE device 24 via the condenser 23. The AFE device 24 has an output terminal connected to a DC restoration circuit, such as a clamp circuit, not shown.

The analog signal buffer 21 includes a first buffer 25 and a second buffer 26, which are connected with each other. As illustrated in any one of FIGS. 4 and 5, the first buffer 25 may be implemented by an emitter follower circuit having an NPN transistor 31 and a resistor 32. The second buffer 26 may be implemented by an emitter follower circuit having a PNP transistor 33 and a resistor 34. The buffer input signal, which is input to the base of the NPN transistor 31, is output to the base of the PNP transistor 33. The emitter of the PNP transistor 33 of the second buffer 26 further outputs the buffer output signal to the condenser 23 and the AFE device 24. The first buffer 25 is supplied with supply voltage Vef1. The second buffer 26 is supplied with supply voltage Vef2 via the delay device 22.

The delay device 22, which may be provided between the power supply of the second buffer 26 and the second buffer 26, delays timing at which rising or falling of the supply voltage of the analog signal buffer 21 is completed such that rise time or fall time of the supply voltage of the analog signal buffer 21 is made longer than rise time or fall time of the supply voltage of the CCD 9. For example, the delay device 22 may be implemented by an RC low pass filter as described below referring to FIG. 4 or 5. The CCD_OUT signal output from the CCD 9, or the buffer input signal, may be excessively high when the power is turned on or when the accumulated charge accumulated in the CCD 9 is discharged, for example, as illustrated in FIG. 6. In order to increase rise time or fall time of the supply voltage of the analog signal buffer 21, the time constant of the delay device 22 may be adjusted such that the rate of change in supply voltage Vef input to the analog signal buffer 21 is made smaller than the rate of change in supply voltage Vccd input to the CCD 9. In this manner, the voltage level of the buffer output signal may be prevented from exceeding a rated voltage level V1 (FIG. 7). Further, since the current flowing in the analog signal buffer 21 is relatively small compared to the current flowing in the CCD 9, the voltage drop in the delay device 22 is relatively small. For example, the current flowing in the CCD 9 may be greater than the current flowing in the analog signal buffer 21 in the order of ten times or more. For this reason, the rate of change in supply voltage Vef may be sufficiently suppressed without requiring the delay device 22 to have an inductance, thus reducing the overall cost and/or the overall size of the delay device 22 or the supply circuit.

Figure 4:
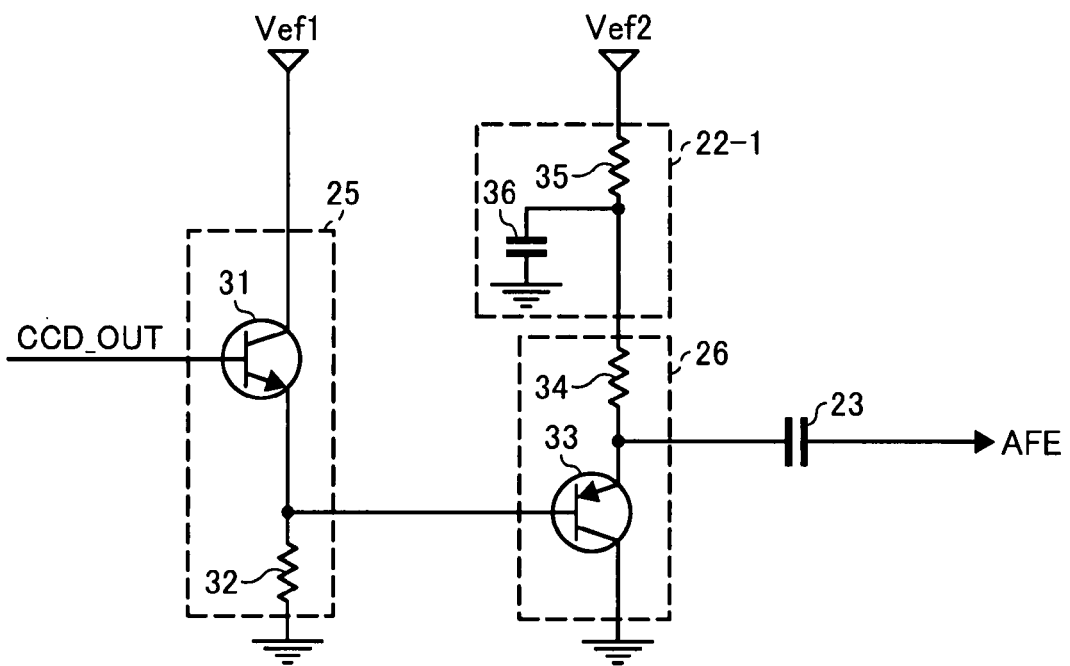
FIG. 4 is a schematic circuit diagram illustrating the buffer circuit shown in FIG. 3, according to an example embodiment of the present invention.

Referring now to FIG. 4, an example circuit structure of the buffer circuit shown in FIG. 3 is explained. The delay device 22 of FIG. 4, which may be referred to as the delay device 22-1, has a resistor 35 and a condenser 36. The resistor 35 has one terminal connected to the power supply Vef2, and the other terminal connected to one terminal of the resistor 34 and one terminal of the condenser 36. The other terminal of the condenser 36 is connected to the ground. Since the supply voltage Vef2 is input to the second buffer 26 via the delay device 22-1, the buffer output signal of the second buffer 26 may be prevented from the abrupt change even when the buffer input signal rapidly changes. In this example, the maximum resistance value of the resistor 35 may be set to about several hundreds ohm. Further, the time constant of the RC filter may be adjusted by changing the capacitance of the condenser 36.

Figure 5:
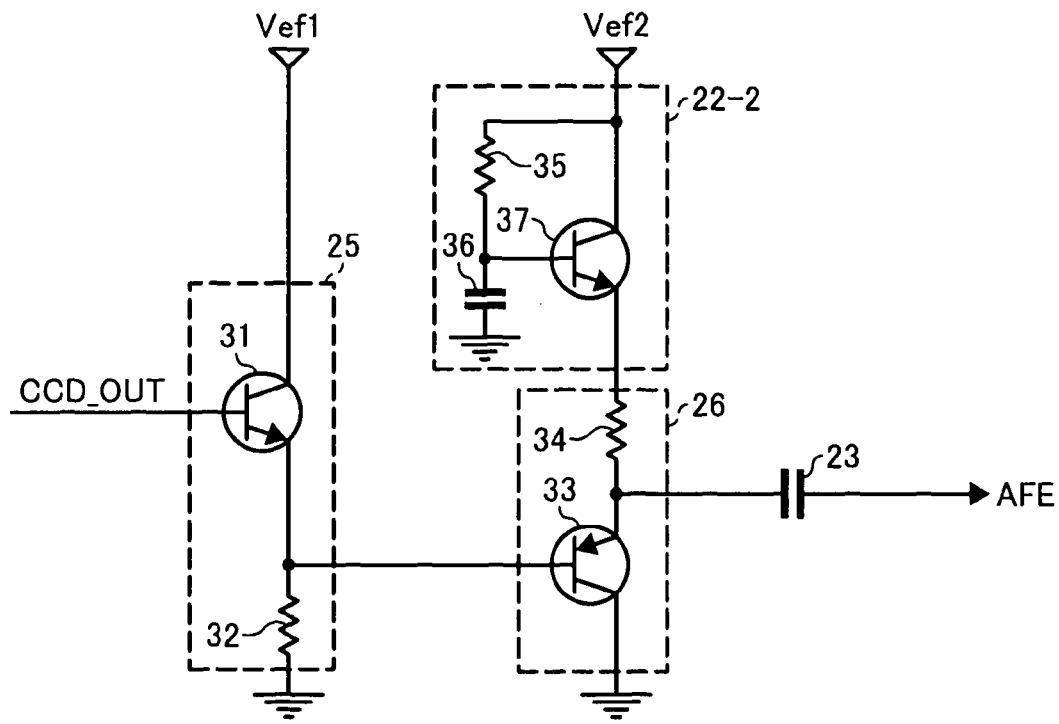
FIG. 5 is a schematic circuit diagram illustrating the buffer circuit shown in FIG. 3, according to an example embodiment of the present invention.
Figure 6:
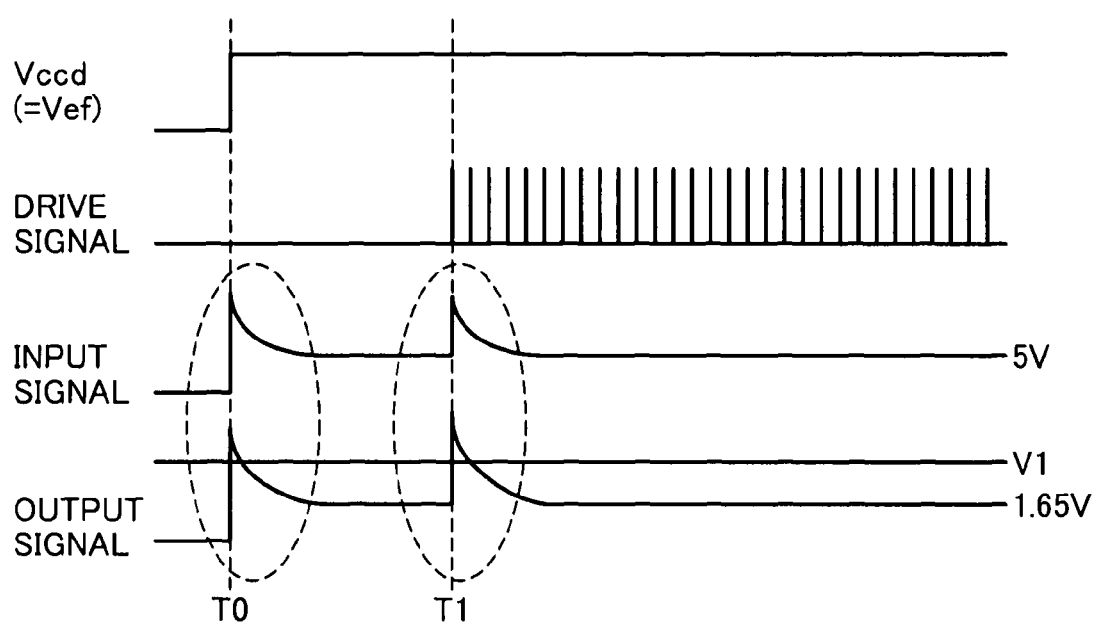
FIG. 6 is a timing chart illustrating a buffer output signal output to an AFE device when a buffer input signal having the excessive voltage level is output from a CCD.

Referring now to FIG. 5, an example circuit structure of the buffer circuit shown in FIG. 3 is explained. The buffer circuit of FIG. 5 is substantially similar in circuit structure to the buffer circuit of FIG. 4, except for the circuit structure of the delay device 22, which may be referred to as the delay device 22-2. The delay device 22-2 includes a transistor 37 in addition to the resistor 35 and the condenser 36. The transistor 37, which may be implemented by an NPN transistor having an emitter follower circuit structure, functions as a current amplifier. The supply voltage Vef2 is input to the base of the transistor 37 at slower rate, which is determined by the resistor 35 and the condenser 36. The emitter voltage of the transistor 37, which is substantially equal to the base voltage, is input to the power supply terminal of the second buffer 26, at which the resistor 34 and the emitter of the transistor 37 are connected. In this example, the amplification ratio hfe, which is the ratio between the collector current and the base current of the transistor 37, may range from a hundred to several hundreds. Further, since the voltage drop in the resistor 35 is relatively small, the maximum resistance value of the resistor 35 may range from several k to several tenth k ohms. By using the transistor 37, which has high hfe characteristics and a low saturated output voltage, the overall size or cost of the delay device 22 may be further reduced. For example, when the image reading device 11 of FIG. 1 is implemented by a color image reading device having three delay devices 22, the delay devices 22 provided for the respective colors of red, green, and blue may be incorporated into one circuit.

In any one of the above-described examples, two buffers are included in the analog signal buffer 21. Alternatively, any desired number of buffers may be provided, as long as at least one delay device 22 is provided.

Referring now to FIGS. 6 and 7, operation of controlling rise time of the analog signal buffer 21 is explained according to an example embodiment of the present invention. As illustrated in FIG. 6, the buffer input signal ("INPUT SIGNAL" in FIG. 6) having the excessive voltage level may be output from the CCD 9 when the supply voltage Vccd is switched from low to high at timing T0. Additionally, the buffer input signal having the excessive voltage level may be output from the CCD 9 when the accumulated voltage, which may be accumulated in the CCD 9 after the power is turned on, is discharged at timing T1 upon receiving the drive signal ("DRIVE SIGNAL" in FIG. 6). In this example, the drive signal may correspond to a clock signal or a shift signal. Once the excessive voltage is input to the analog signal buffer 21, the analog signal buffer 21 may output the buffer output signal ("OUTPUT SIGNAL" in FIG. 6) having the voltage level exceeding the rated voltage level V1.

In order to suppress the adverse influence of the excessive voltage on the AFE device 24, rise time of the supply voltage of the analog signal buffer 21 is made longer than rise time of the supply voltage of the CCD 9. Preferably, in this example, rise time of the supply voltage of the analog signal buffer 21 is made equal to or greater than a time period between timing T0 and timing T1. For example, as illustrated in FIG. 7, when the supply voltage of the CCD 9 starts rising at timing T0, the supply voltage of the analog signal buffer 21 starts rising. The rate of increasing the supply voltage Vef is controlled such that the supply voltage Vef of the analog signal buffer 21 completes rising at timing T2, after timing T0 at which the supply voltage Vccd of the CCD 9 completes rising, and preferably after timing T1 at which the drive signal is input to the CCD 9. Since timing T2 for completing rising of the supply voltage of the analog signal buffer 21 is sufficiently delayed, or rise time Ts of the supply voltage of the analog signal buffer 21 is sufficiently increased, the buffer output signal output to the AFE 24 ("OUTPUT SIGNAL" in FIG. 7) is prevented from exceeding the rated voltage level V1.

Figure 8A:
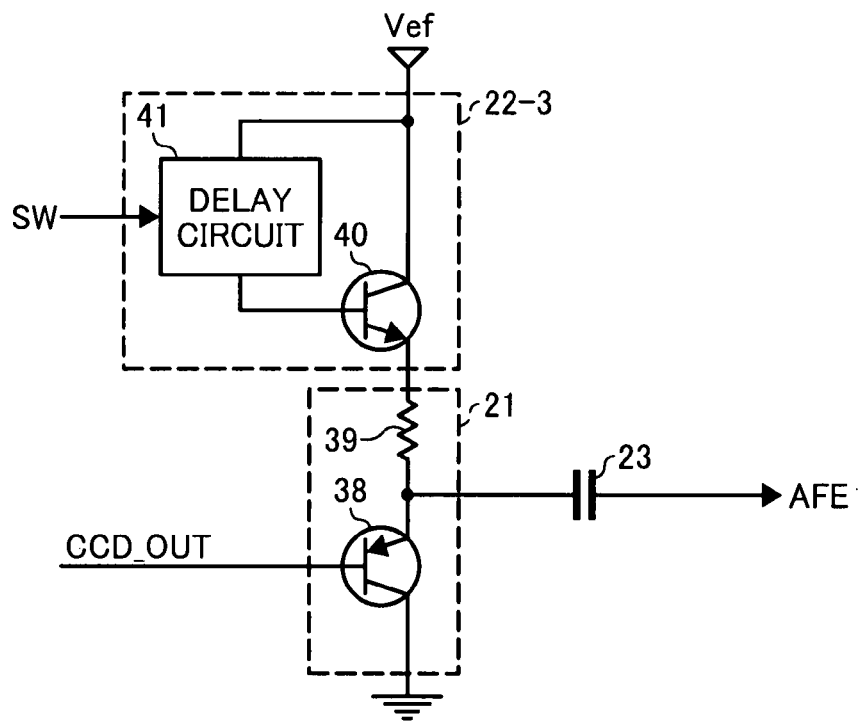
FIG. 8A is a schematic circuit diagram illustrating a buffer circuit provided between a CCD and an AFE device, according to an example embodiment of the present invention.

Referring now to FIG. 8A, a buffer circuit is explained according to an example embodiment of the present invention. The buffer circuit of FIG. 8A is substantially similar in circuit structure to the buffer circuit of FIG. 3. The differences include a circuit structure of the delay device 22, which may be refereed to as the delay device 22-3, and the analog signal buffer 21.

The analog signal buffer 21 includes a PNP transistor 38 and a resistor 39. The resistor 39 is connected to the emitter of the transistor 38. The CCD_OUT signal output from the CCD 9, or the buffer input signal, is input to the base of the transistor 38. The CCD_OUT signal, or the buffer output signal, is further output from one terminal of the resistor 39 to the AFE through the condenser 23. The other terminal of the resistor 39 is supplied with the supply voltage Vef through the delay device 22-3. The delay device 22-3 includes an NPN transistor 40 and a delay circuit 41. The collector of the transistor 40 is connected to the power supply. The delay circuit 41 includes one terminal connected to the power supply and the other terminal connected to the base of the transistor 40. The delay circuit 41 may change its time constant according to a switch signal SW provided from the outside.

Figure 8B:
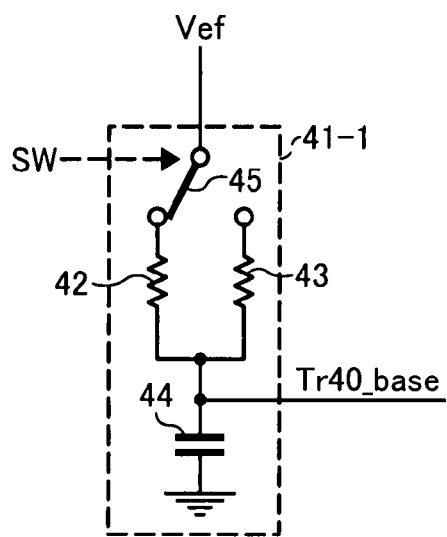
FIG. 8B is a schematic circuit diagram illustrating a delay circuit shown in FIG. 8A, according to an example embodiment of the present invention.
Figure 8C:
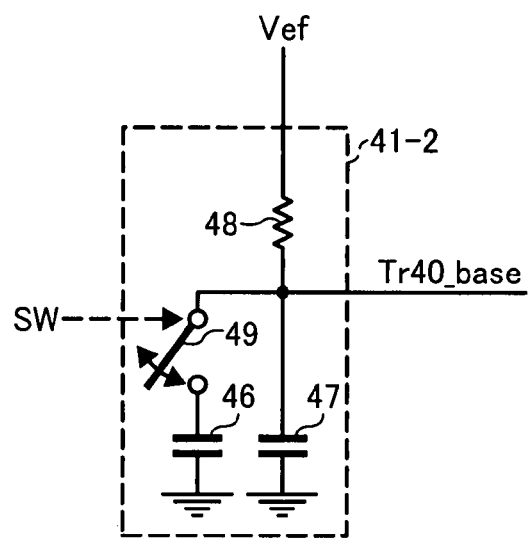
FIG. 8C is a schematic circuit diagram illustrating a delay circuit shown in FIG. 8A, according to an example embodiment of the present invention.

The delay circuit 41 may be implemented by an RC filter, for example, as illustrated in any one of FIGS. 8B and 8C. Referring to FIG. 8B, the delay circuit 41-1 includes a switch 45, a resistor 42, a resistor 43, and a condenser 44. The switch 45 may be used to switch between the resistor 42 and the resistor 43 such that the time constant of the delay circuit 41-1 may be changed. Accordingly, the rate of change in supply voltage during rise time or fall time may be controlled by switching the resistance value of the RC filter.

Referring to FIG. 8C, the delay circuit 41-2 includes a condenser 46, a condenser 47, a resistor 48, and a switch 49. The switch 49 may be used to switch between the condenser 46 and the condenser 47 such that the time constant of the delay circuit 41-2 may be changed. Accordingly, the rate of change in supply voltage during rise time or fall time may be controlled by switching the capacitance value of the RC filter.

Figure 9:
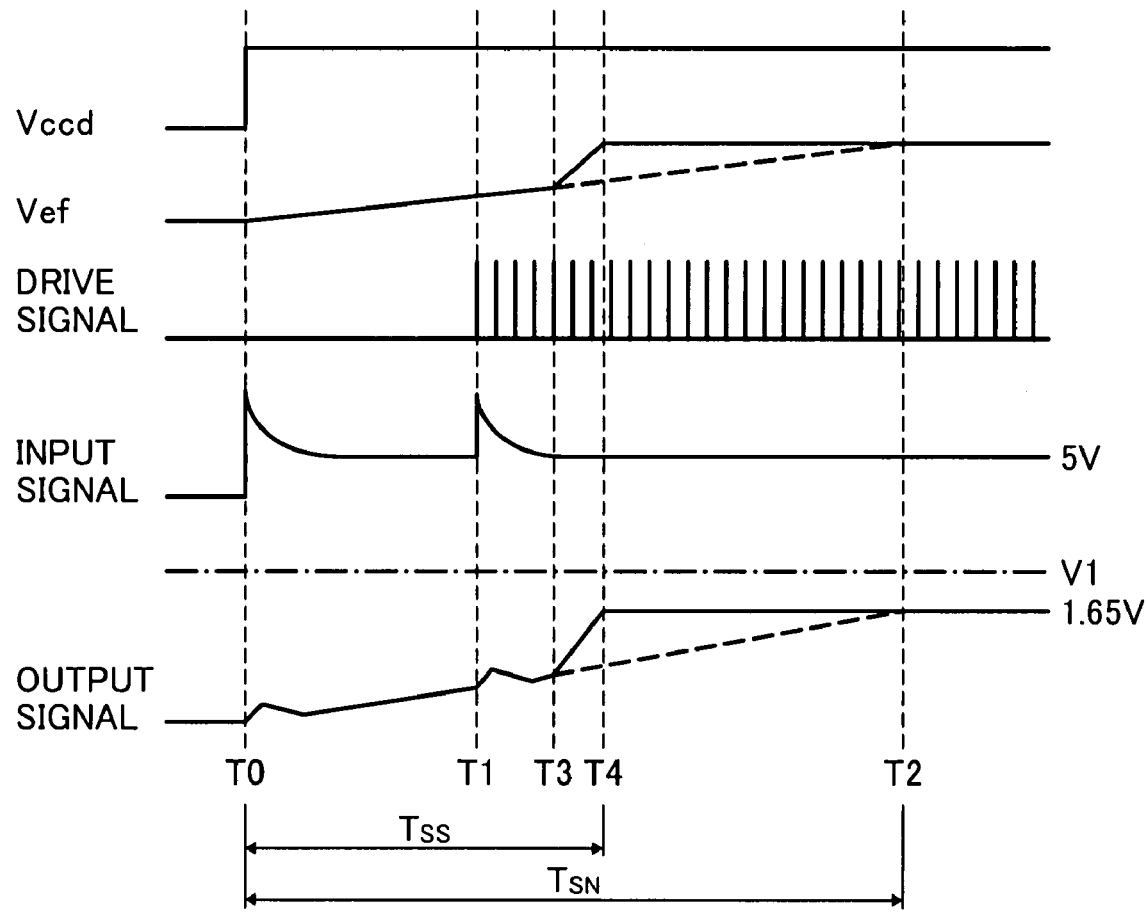
FIG. 9 is a timing chart illustrating operation of controlling rise time of an analog signal buffer when a buffer input signal having the excessive voltage level is input to the analog signal buffer, according to an example embodiment of the present invention.

Referring to FIG. 9, operation of controlling rise time of the analog signal buffer 21 is explained according to an example embodiment of the present invention.

When the supply voltage Vcdd of the CCD 9 is switched from low to high at timing T0, or when the drive signal is input to the CCD 9 at timing T1, the CCD 9 may output the buffer input signal ("INPUT SIGNAL" in FIG. 9) having the excessive voltage level. In order to suppress the adverse influence of the excessive voltage, the supply voltage Vef of the analog signal buffer 21 may be caused to gradually increase until the voltage level reaches a predetermined reference level at timing T2, as described above referring to FIG. 7. However, with the structure shown in FIG. 8A, the rate of change in supply voltage of the analog signal buffer 21 may be changed by switching the time constant of the delay device 22-3. In this manner, rise time or fall time may be shortened while preventing the buffer output signal from exceeding a rated voltage level.

For example, referring to FIG. 9, the time constant of the delay circuit 41 may be switched at any time after timing T1 as long as it is determined that the level of the buffer input signal ("INPUT SIGNAL" in FIG. 9) is sufficiently reduced. In this example, when the level of the buffer input signal reaches a predetermined level, such as about 5 V at timing T3, the time constant of the delay device 22-3 may be switched to increase the rate of change in supply voltage Vef. When compared to the example case of FIG. 7 in which the analog signal buffer 21 has the rise time $T_{SN}$, the rise time $T_{SS}$ of the analog signal buffer 21 may be reduced such that the analog signal buffer 21 completes rising at timing T4.

In this example, timing for generating the switch signal SW of FIG. 8A may be previously set by default. Alternatively, timing for generating the switch signal SW of FIG. 8A may be set based on a detection signal indicating whether the buffer input signal input to the analog signal buffer 21 is sufficiently reduced. For example, as illustrated in any one of FIGS. 10A and 10B, a signal offset detector 51 may be additionally provided, which generates the switch signal SW. The signal offset detector 51 detects an offset level, such as DC level, of the buffer output signal input to the AFE device 24, and generates the switch signal SW based on the detected offset signal to cause the delay circuit 41 to automatically switch its time constant according to the detected offset signal. In this manner, timing T3 for generating the switch signal, which may vary from system to system, may be determined with higher accuracy.

Figure 10B:
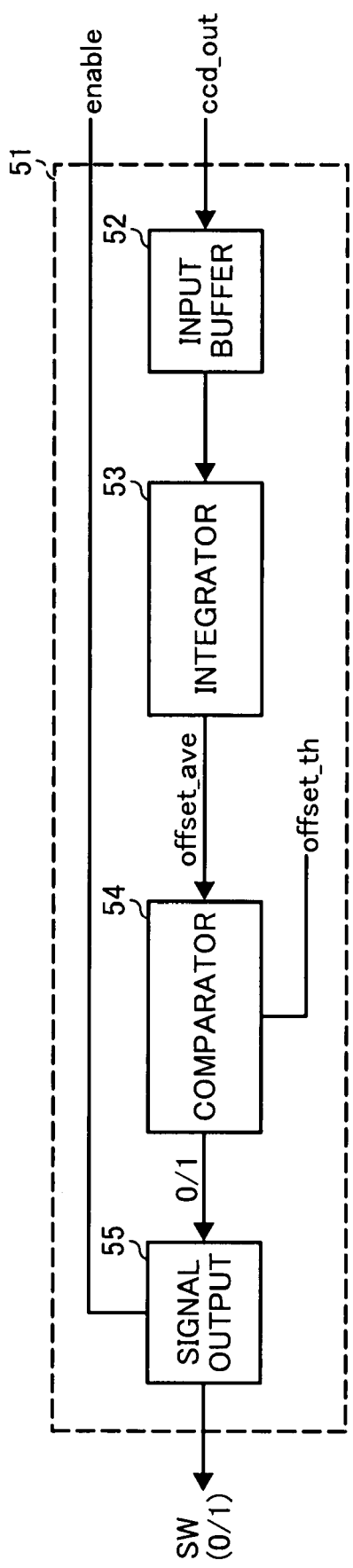
FIG. 10B is a schematic block diagram illustrating a signal offset detector shown in FIG. 10A, according to an example embodiment of the present invention.

As illustrated in FIG. 10B, the signal offset detector 51 includes an input buffer 52, an integrator 53, a comparator 54, and a signal output 55. The input buffer 52 inputs the buffer output signal ("CCD_OUT" shown in FIG. 10B) via the analog signal buffer 21 and the condenser 23. The integrator 53 removes a noise component and an AC component from the buffer output signal to output the offset level "offset_ave". The comparator 54 compares the offset level "offset_ave" of the buffer output signal with a threshold level or a threshold range "offset_th", which may be previously set. When the offset level "offset_ave" is equal to or less than the threshold level or range "offset_th", the comparator 54 outputs the level 1. When the offset level "offset_ave" is greater than the threshold level or range "offset_th", the comparator 54 outputs the level 0. When the output level of the comparator 54 is 1, the signal output 55 outputs a switch signal SW having the high level H or the value 1. When the output level of the comparator 54 is 0, the signal output 55 outputs a switch signal SW having the low level L or the value 0. When the switch signal is set to 1, the time constant of the delay circuit 41 is set to low. When the switch signal is set to 0, the time constant of the delay circuit 41 is set to high.

Alternatively, in this example, the time constant of the delay circuit 41 may be set to low when the switch signal is set to 0, while the time constant of the delay circuit 41 may be set to high when the switch signal is set to 1. However, by setting the time constant of the delay circuit 41 to high by default when the switch signal is 0, the supply voltage Vef of the analog signal buffer 21 is automatically caused to change at slower rate when the power is turned on. Further, in this example, the input buffer 52 may be preferably provided so as to suppress the adverse influence of the integrator 53 on the signal input to the AFE device 24.

In this example, the signal offset detector 51 is not initially activated. To activate the signal offset detector 51, an enable signal (FIG. 10A) is input to the signal offset detector 51 after timing T1 (FIG. 9). When the signal offset signal 51 is not activated, the switch signal SW may have the invalid value. In such case, the pull-down resistance may be applied to the output terminal of the signal output 55.

In operation, when the power is turned on, the switch signal SW is set to 0 by default such that the supply voltage Vef changes at slower rate. Since the signal offset detector 51 is not activated, the output of the signal output 55 becomes invalid. In such case, the pull-down resistance is input to the delay circuit 41. Alternatively, the signal output 55 may be caused to output the valid value by activating the signal offset detector 51, as long as the switch signal SW having the 0 value is output. After timing T1 when the drive signal is input to the CCD 9, the value of the switch signal SW may be switched to 1 such that the supply voltage Vef changes at faster rate. For example, when the offset level "offset_ave" output by the integrator 53 is equal to or less than the threshold level or range "offset_th", the switch signal SW is switched from 0 to 1.

In this example, the threshold value may be set to any value equal to or greater than the offset level "offset_ave", and equal to or less than a predetermined reference voltage level set specifically for the AFE device 24. The threshold range may be determined based on the threshold value.

Figure 11A:
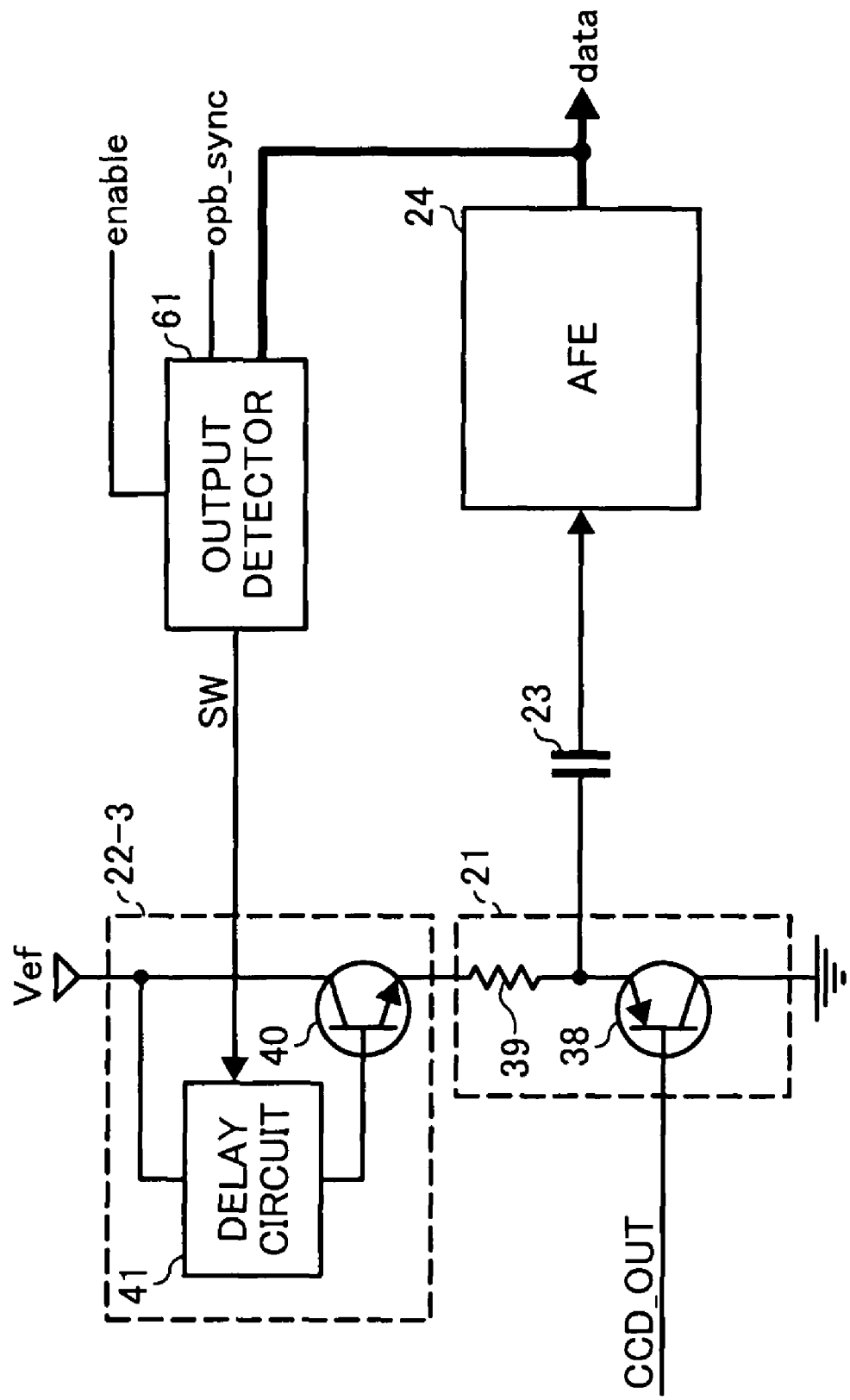
FIG. 11A is a schematic block diagram illustrating a buffer circuit provided between a CCD and an AFE device, according to an example embodiment of the present invention.
Figure 11B:
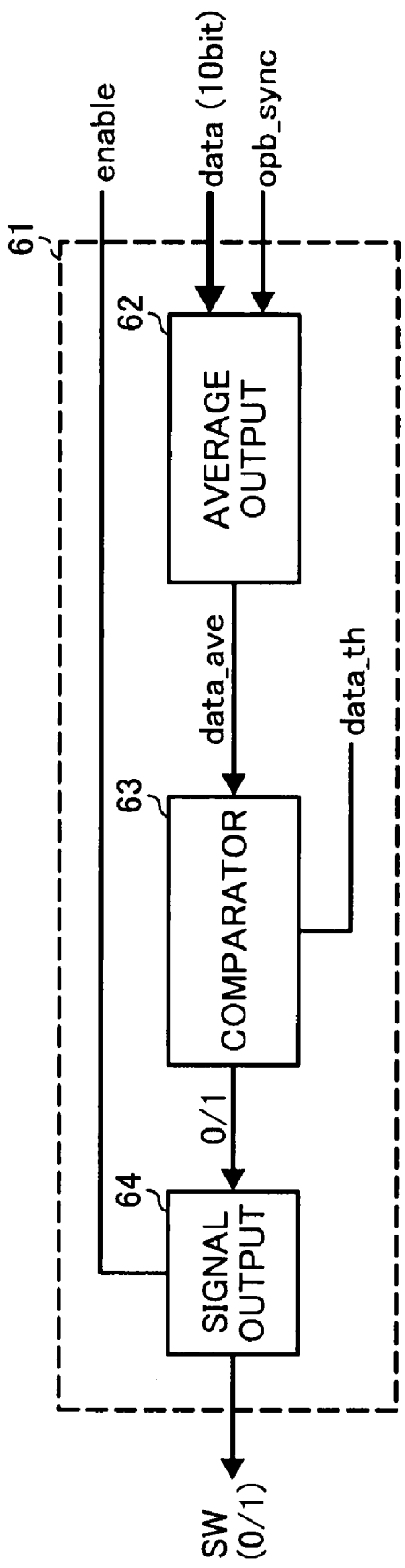
FIG. 11B is a schematic block diagram illustrating an output detector shown in FIG. 11A, according to an example embodiment of the present invention.

Referring now to FIGS. 11A and 11B, a buffer circuit is explained according to an example embodiment of the present invention. The buffer circuit of FIG. 11A is substantially similar in circuit structure to the buffer circuit of FIG. 10A. The differences include the replacement of the signal offset detector 51 with an output detector 61. The output detector 61 monitors black signal data, which is a digital value determined based on the signal offset level and a reference voltage level of the AFE 24. Based on the black signal data, the output detector 61 generates a switch signal SW to cause the delay circuit 41 to change its time constant in a substantially similar manner as described above referring to any one of FIGS. 8A, 8B, and 9. In this manner, time lag or current leakage, which may be introduced before the signal is input to the AFE device 24 when the analog circuit is additionally inserted between the CCD 9 and the AFE device 24, may be suppressed.

Referring to FIG. 11B, the output detector 61 includes an average output 62, a comparator 63 and a signal output 64.

The average output 62 receives black signal data output by the AFE device 24 line by line, and a synchronization signal opb_sync indicating a time period in which the black signal data is output. In this example, the synchronization signal opb_sync determines the number of black signal data samples per line. The average output 62 averages the black signal data received for a plurality of lines to output average data "data_ave". In this example, the number of plurality of lines used for averaging is determined by a signal output from a register. The comparator 63 compares the average data "data_ave" with a threshold value or range "data_th". When the average data "data_ave" is equal to or less than the threshold value or range "data_th", the comparator 63 outputs the level 1. When the average data "data_ave" is greater than the threshold value or range "data_th", the comparator 63 outputs the level 0. The signal output 64 outputs a switch signal SW having the value 1 or the high level H when the output level of the comparator 63 is 1. The signal output 64 outputs a switch signal SW having the value 0 or the low level L when the output level of the comparator 63 is 0. Alternatively, the signal output 64 may output a switch signal SW having the value 0 or the low level L when the output level of the comparator is 0, and output a switch signal SW having the value 1 or the high level H when the output level of the comparator is 1.

In any one of the above-described examples, the function of generating a switch signal SW is provided by adding an analog circuit, such as the signal offset detector 51 of FIG. 10A or the output detector 61 of FIG. 11A, to the buffer circuit. However, providing the additional circuit may increase the overall size of the buffer circuit. In order to keep the circuit size small, the signal offset detector 51 or the output detector 61 may be incorporated in the AFE device 24, as described below referring to FIG. 12A or 12B.

Figure 12B:
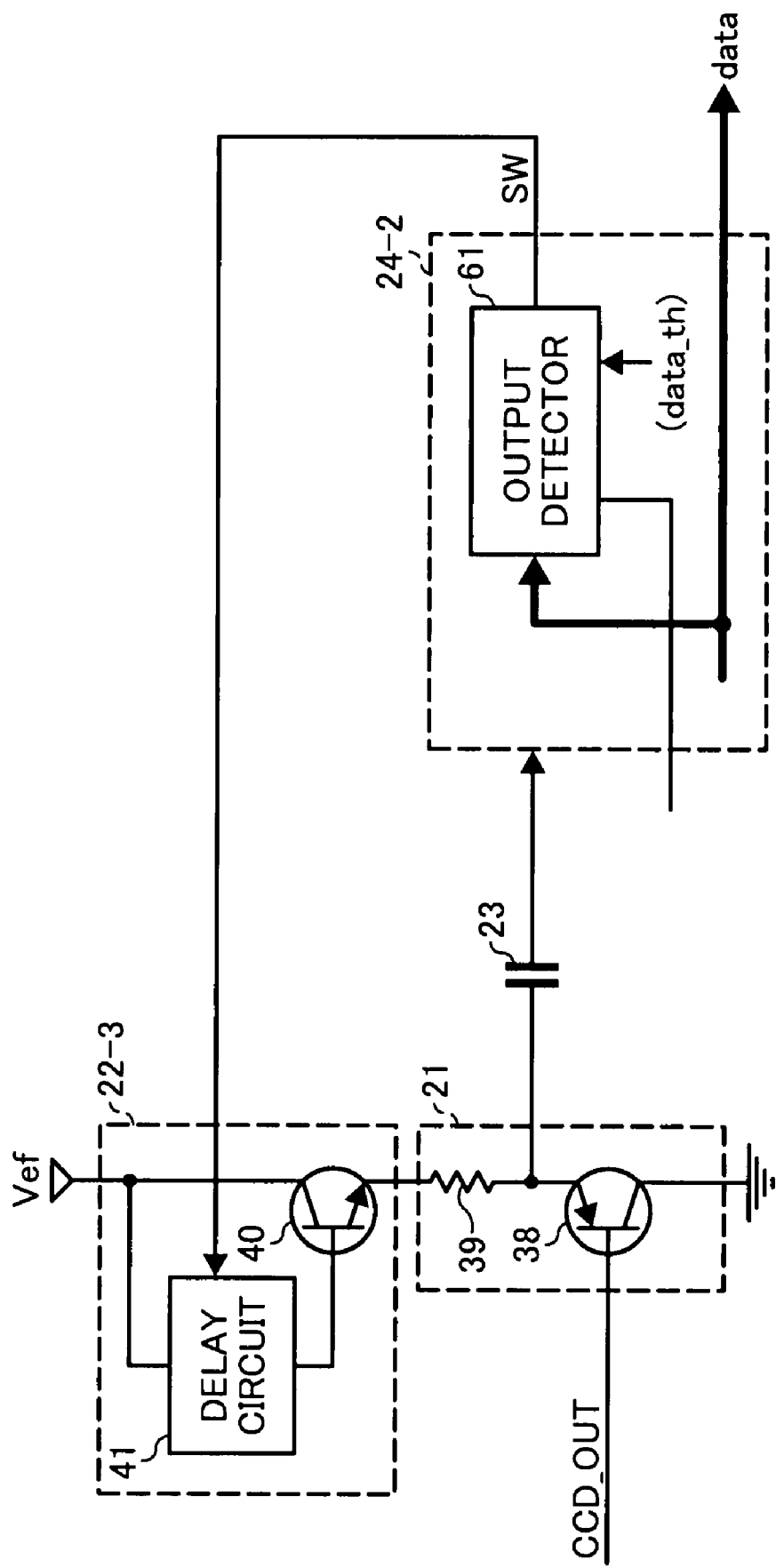
FIG. 12B is a schematic block diagram illustrating an AFE device and a buffer circuit, according to an example embodiment of the present invention.

Referring to FIG. 12A, the signal offset detector 51 is incorporated in the AFE device 24, which may be referred as the AFE device 24-1. Referring to FIG. 12B, the output detector 61 is incorporated in the AFE device 24, which may be referred as the AFE device 24-2. Any one of the AFE devices 24-1 and 24-2 has the function of outputting a switch signal SW. In this example, a threshold level or range, such as the threshold level or range of the offset signal offset_th or the threshold level or range of the black signal data data_th, and/or the enable signal may be controlled by a register or an outside terminal.

Any one of the examples described above referring to FIGS. 3 to 12B protects the AFE device 24 from the adverse influence of excessive voltage by controlling the voltage across the analog signal buffer 21. Additionally or alternatively, the AFE device 24, which is usually coupled to a diode, may be protected from the adverse influence of excessive current by controlling the current across the analog signal buffer 21.

Figure 13A:
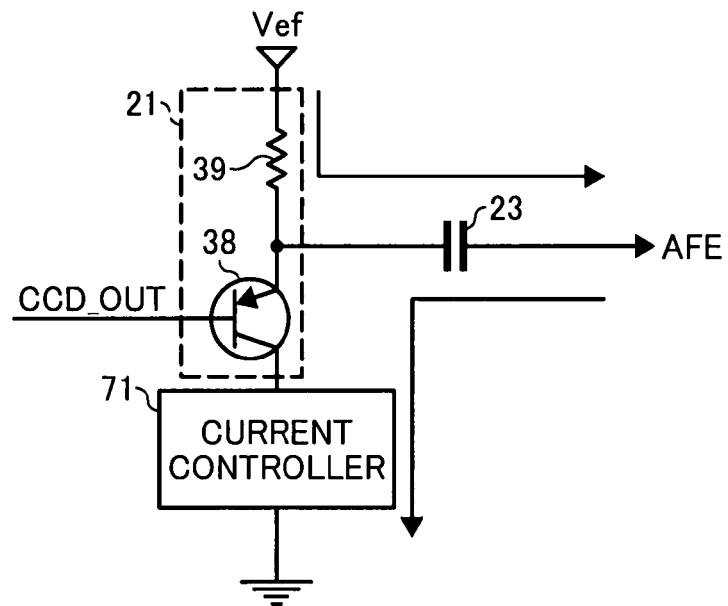
FIG. 13A is a schematic block diagram illustrating a buffer circuit provided between a CCD and an AFE device, according to an example embodiment of the present invention.

Referring to FIG. 13A, a buffer circuit is explained according to an example embodiment of the present invention. The buffer circuit of FIG. 13A includes the capacitor 23, the analog signal buffer 21 having an emitter follower circuit structure provided with the PNP transistor 38 and the resistor 39, and a current controller 71 provided between the collector of the transistor 38 and the ground. The CCD_OUT signal, which is input to the base of the transistor 38, is output from the emitter of the transistor 38 to the AFE device 24 via the capacitor 23. The emitter current of the transistor 38, which is the source current, is controlled by the resistor 39 connected to the emitter of the transistor 38. The collector current of the transistor 38 is controlled by the current controller 71. Further, as indicated by the arrow in FIG. 13A, the current flowing into the AFE device 24 and the current flowing out from the AFE device 24 both flow through the analog signal buffer 21. By controlling the current across the analog signal buffer 21, the current controller 71 can control the current following in or out from the AFE device 24. Specifically, in this example, the current across the analog signal buffer 21 is prevented from exceeding a reference current level.

In this example, the analog signal buffer 21 includes a single buffer. Alternatively, any number of buffer may be provided, for example, as illustrated in FIG. 4 or 5. In such case, the current controller 71 controls the current flowing in each buffer.

Figure 13B:
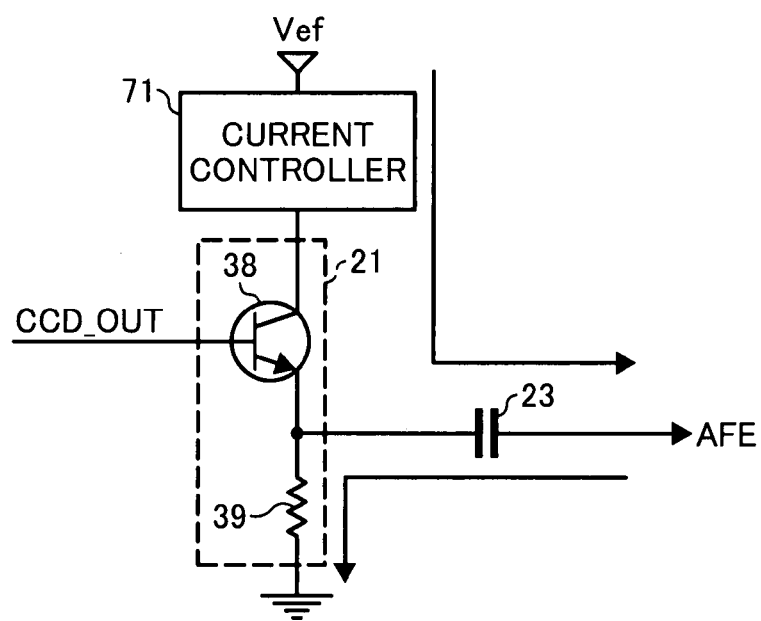
FIG. 13B is a schematic block diagram illustrating a buffer circuit provided between a CCD and an AFE device, according to an example embodiment of the present invention.

Referring to FIG. 13B, a buffer circuit is explained according to an example embodiment of the present invention. The buffer circuit of FIG. 13B includes the capacitor 23, the analog signal buffer 21 having an emitter follower circuit structure provided with the NPN transistor 38 and the resistor 39, and the current controller 71 provided between the collector of the transistor 38 and the power supply. The buffer circuit of FIG. 13B functions in a substantially similar manner as described above referring to FIG. 13A, except for the direction of the current flowing in or out. Specifically, in this example, the emitter current of the transistor 38 is the drain current.

Figure 14A:
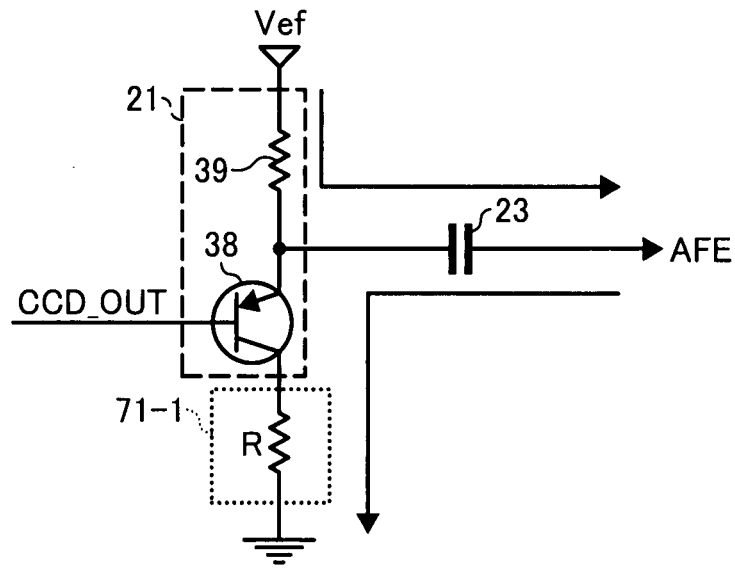
FIG. 14A is a schematic circuit diagram illustrating a current controller shown in FIG. 13A, according to an example embodiment of the present invention.
Figure 14B:
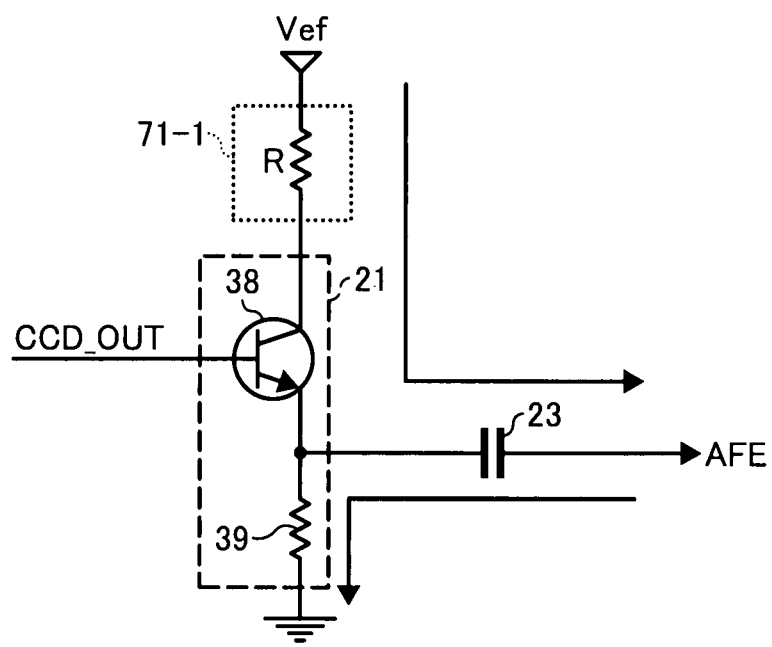
FIG. 14B is a schematic circuit diagram illustrating a current controller shown in FIG. 13B, according to an example embodiment of the present invention.

The current controller 71 of FIG. 13A or 13B may be implemented in various ways. In one example, the current controller 71 of FIG. 13A or 13B may be implemented by a resistor 71-1 as illustrated in FIG. 14A or 14B. Since the current fluctuates due to the output signal from the transistor 38 or the collector current of the transistor 38, the resistance of the resistor 71-1 may need to be set to relatively high. This may cause degradation of the signal waveform due to the mirror effect.

Figure 15A:
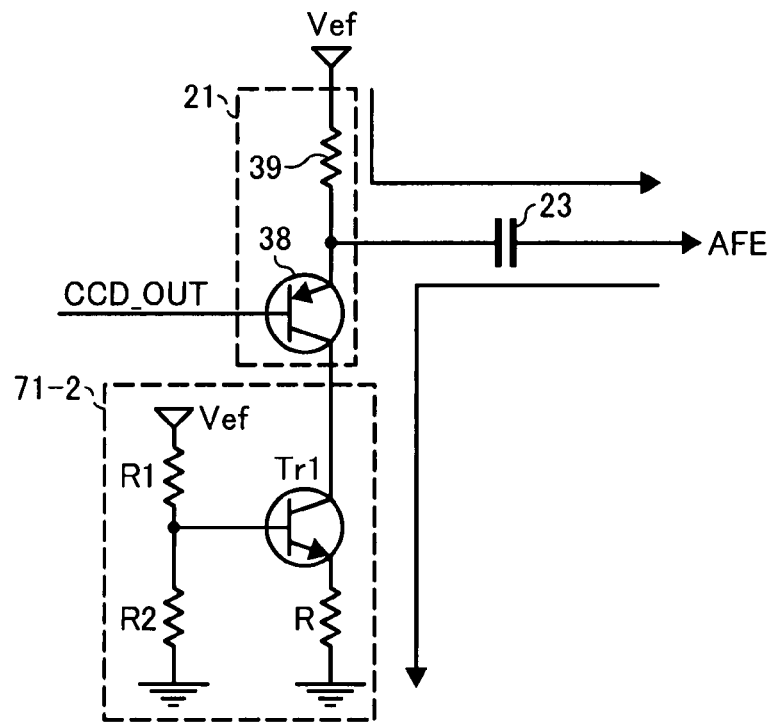
FIG. 15A is a schematic circuit diagram illustrating a current controller shown in FIG. 13A, according to an example embodiment of the present invention.
Figure 15B:
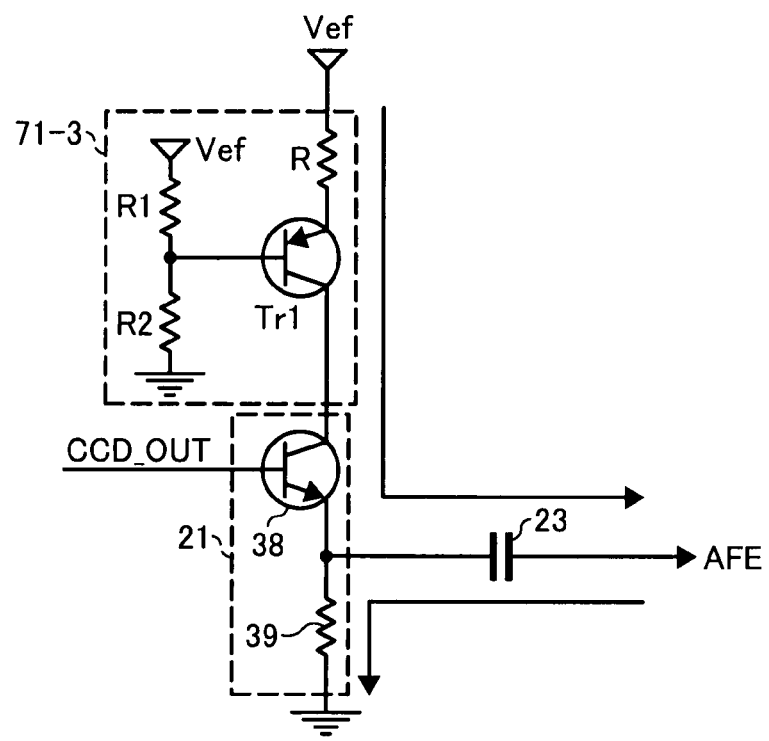
FIG. 15B is a schematic circuit diagram illustrating a current controller shown in FIG. 13B, according to an example embodiment of the present invention.

Alternatively, the current controller 71 of FIG. 13A or 13B may be implemented by a fixed current supply as illustrated in FIG. 15A or 15B. Referring to FIG. 15A, the buffer circuit includes the capacitor 23, the analog signal buffer 21 having an emitter follower structure provided with the PNP transistor 38 and the resistor 39, and the current controller 71-2 having an NPN transistor Tr1, a resistor R1, a resistor R2, and a resistor R. The collector of the transistor Tr1 is connected to the collector of the transistor 38. The emitter of the transistor Tr1 is connected to the ground via the emitter resistor R. The base of the transistor Tr1 is supplied with the divided voltage of the supply voltage Vef, which is obtained by dividing the supply voltage Vef by the resistors R1 and R2.

Referring to FIG. 15B, the buffer circuit includes the capacitor 23, the analog signal buffer 21 having an emitter follower structure provide with the NPN transistor 38 and the resistor 39, and the current controller 71-3 having a PNP transistor Tr1 and the resistors R, R1, and R2. The collector of the transistor Tr1 is connected to the collector of the transistor 38. The emitter of the transistor Tr1 is connected to the power supply via the resistor R. The base of the transistor Tr1 is supplied with the divided supply voltage Vef, which is obtained by dividing the supply voltage Vef by the resistors R1 and R2.

Referring to FIGS. 15A and 15B, since the transistor Tr1 has the emitter follower structure, the collector current of the transistor 38, which is input to the AFE device 24, is determined based on the base potential of the transistor Tr1 and the emitter resistor R. With this structure, the fluctuation in current may be suppressed such that the resistance value of the resistor R may be made smaller than the example case shown in FIG. 14A or 14B.

Figure 16A:
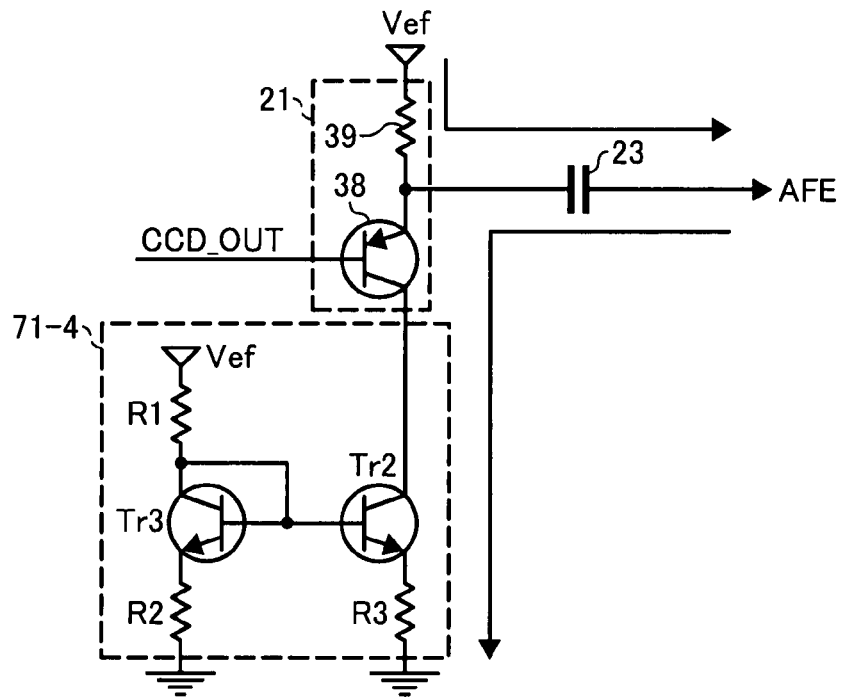
FIG. 16A is a schematic circuit diagram illustrating a current controller shown in FIG. 13A, according to an example embodiment of the present invention.
Figure 16B:
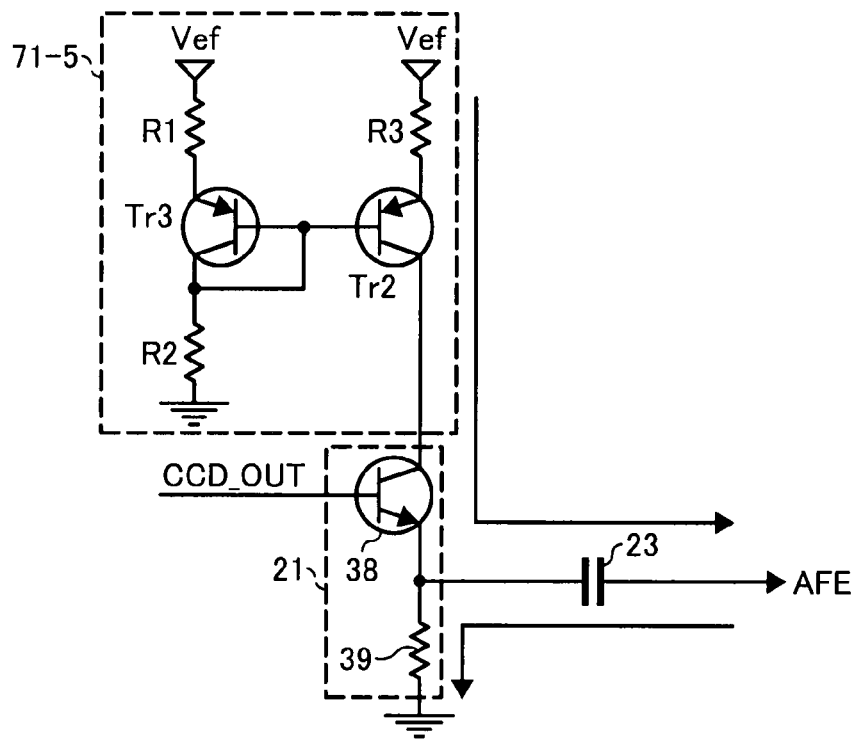
FIG. 16B is a schematic circuit diagram illustrating a current controller shown I FIG. 13B, according to an example embodiment of the present invention.

In another example, the current controller 71 of FIG. 13A or 13B may be implemented by a current mirror circuit, for example, as illustrated in FIG. 16A or 16B.

Referring to FIG. 16A or 16B, the base potential of the transistor Tr2 is controlled by the transistor Tr3 such that the base potential of the transistor Tr3 and the base potential of the transistor Tr2 are made equal with each other. When the resistors R2 and R3 have the same resistance values, the current flowing in the transistor 38 of the analog signal buffer 21 may be controlled by the transistor Tr3 since the collector current of the transistor Tr3 and the collector current of the Tr2 are equal with each other.

Alternatively, the resistor R2 and the resistor R3 may have the resistance values different from each other. In such case, each one of the circuits shown in FIGS. 16A and 16B does not function as the current mirror circuit.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

The invention claimed is:

1. A buffer circuit provided between a photoelectric converting element and an analog signal processing circuit, the buffer circuit comprising:
   an analog signal buffer configured to input an electric analog signal output from the photoelectric converting element and output the electric analog signal to the analog signal processing circuit;
   a power supply configured to input a supply voltage to the analog signal buffer; and
   a delay device provided between the power supply and the analog signal buffer and configured to control a rate of change in the supply voltage input to the analog signal buffer such that rise time or fall time of the supply voltage of the analog signal buffer is made longer than rise time or fall time of a supply voltage of the photoelectric converting element, wherein the delay device comprises:
   a delay circuit comprising:
      a resistor having one terminal coupled to the power supply; and
      a condenser having one terminal coupled to the other terminal of the resistor,
   wherein the rate of change in the supply voltage input to the analog signal buffer is determined by time constant of the delay circuit.

2. The circuit of claim 1, wherein the delay device further comprises:
   an NPN transistor having a collector coupled to the power supply, a base coupled to the power supply via the resistor and the condenser, and an emitter coupled to the analog signal buffer.

3. The circuit of claim 1, wherein the rise time of the supply voltage of the analog signal buffer is made longer than a time period between timing at which the supply voltage of the photoelectric converting element starts rising and timing at which a drive signal is input to the photoelectric converting element.

4. The circuit of claim 1, further comprising:
   a switch configured to change the time constant of the delay circuit upon receiving a switch signal, the time constant being determined based on at least one of resistance of the resistor and capacitance of the condenser.

5. The circuit of claim 4, wherein timing at which the switch signal is output occurs after timing at which a drive signal is input to the photoelectric converting element.

6. The circuit of claim 4, further comprising:
   a detector configured to detect whether the electric analog signal output from the photoelectric converting element has a voltage level equal to or less than a predetermined level to generate a detection signal, and output the switch signal having a value determined based on the detection signal.

7. The circuit of claim 6, wherein the detector is activated at timing at which a drive signal is input to the photoelectric converting element.

8. A buffer circuit provided between a photoelectric converting element and an analog signal processing circuit, the buffer circuit comprising:
   an analog signal buffer comprising a transistor, configured to input an electric analog signal output from the photoelectric converting element and output the electric analog signal to the analog signal processing circuit; and
   a current controller coupled to a collector of the transistor of the analog signal buffer and configured to control a current that flows between the analog signal processing circuit and the analog signal buffer such that the current is prevented from exceeding a reference level.

9. The circuit of claim 8, wherein the current controller comprises:
   a resistor having one terminal coupled to the collector of the transistor of the analog signal buffer.

10. The circuit of claim 8, wherein the current controller has an emitter follower circuit structure.

11. The circuit of claim 8, wherein the current controller has a current mirror circuit structure.

12. An image reading apparatus, comprising:
   a photoelectric converting element configured to convert light reflected from an original to an analog electric signal;
   an analog signal processing circuit configured to apply analog signal processing to the analog electric signal, the analog signal processing comprising converting the analog electric signal to a digital electric signal;
   an analog signal buffer provided between the photoelectric converting element and the analog signal processing circuit and configured to drive the analog signal processing circuit; and
   a delay device provided between a power supply and the analog signal buffer and configured to control a rate of change in a supply voltage input to the analog signal buffer such that rise time or fall time of the supply voltage of the analog signal buffer is made longer than rise time or fall time of a supply voltage of the photoelectric converting element, wherein the delay device comprises:
   a delay circuit comprising:
      a resistor having one terminal coupled to the power supply; and
      a condenser having one terminal coupled to the other terminal of the resistor,
   wherein the rate of change in the supply voltage input to the analog signal buffer is determined by time constant of the delay circuit.

13. The apparatus of claim 12, wherein the delay device further comprises:
   an NPN transistor having a collector coupled to the power supply, a base coupled to the power supply via the resistor and the condenser, and an emitter coupled to the analog signal buffer.

14. The apparatus of claim 12, wherein the delay device further comprises:
   a switch configured to change the time constant of the delay circuit upon receiving a switch signal, the time constant being determined based on at least one of resistance of the resistor and capacitance of the condenser.

15. The apparatus of claim 14, further comprising:
   a detector configured to detect whether the electric analog signal output from the photoelectric converting element has a voltage level equal to or less than a predetermined level to generate a detection signal, and output the switch signal having a value determined based on the detection signal.

16. The apparatus of claim 15, wherein the detector is incorporated in the analog signal processing circuit.

17. The apparatus of claim 12, wherein the delay device comprises an RC filter.

18. The apparatus of claim 12, further comprising:
   a current controller coupled to the analog signal buffer and configured to control a current that flows between the analog signal processing circuit and the analog signal buffer.

* * * * *